US009430532B2

(12) United States Patent
Basilico

(10) Patent No.: US 9,430,532 B2
(45) Date of Patent: Aug. 30, 2016

(54) MEDIA CONTENT RANKINGS FOR DISCOVERY OF NOVEL CONTENT

(71) Applicant: NETFLIX.COM, INC., Los Gatos, CA (US)

(72) Inventor: Justin D. Basilico, Saratoga, CA (US)

(73) Assignee: Netflix Inc., Los Gatos, CA (US)

( * ) Notice: Subject to any disclaimer, the term of this patent is extended or adjusted under 35 U.S.C. 154(b) by 130 days.

(21) Appl. No.: 13/954,780

(22) Filed: Jul. 30, 2013

(65) Prior Publication Data

US 2015/0039608 A1 Feb. 5, 2015

(51) Int. Cl.
*G06F 17/30* (2006.01)

(52) U.S. Cl.
CPC .................. *G06F 17/3053* (2013.01)

(58) Field of Classification Search
CPC .................. G06F 17/30702; G06F 17/30867; G06F 17/3053; G06Q 30/0201
See application file for complete search history.

(56) References Cited

U.S. PATENT DOCUMENTS

| | | | |
|---|---|---|---|
| 8,126,881 B1* | 2/2012 | Sethi et al. | 707/723 |
| 2007/0198459 A1* | 8/2007 | Boone et al. | 707/1 |
| 2007/0233672 A1* | 10/2007 | Sanfacon et al. | 707/5 |
| 2012/0054144 A1* | 3/2012 | Barbieri et al. | 706/52 |
| 2013/0325794 A1* | 12/2013 | Hatami-Hanza | 707/603 |
| 2014/0280214 A1* | 9/2014 | Han et al. | 707/748 |

FOREIGN PATENT DOCUMENTS

EP   2169854 A1 *  3/2010   ............. H04H 60/46

* cited by examiner

*Primary Examiner* — Scott A Waldron
*Assistant Examiner* — Soheila Davanlou
(74) *Attorney, Agent, or Firm* — Hickman Palermo Becker Bingham LLP

(57) ABSTRACT

A content provider system ranks media content items with respect to a particular user based on selection scores determined for each of the media content items. The selection scores may be determined using a particular model that calculates a predicted selection score based on feature values associated with the content item with respect to the particular user. The feature values may indicate properties of the media content item, the particular user, or the particular user's relationship with the content item, including information about the novelty of the media content item with respect to the user. The particular model may be trained with sample user consumption data points that represent various combinations of media content items and users. The data point information evaluated during the training of the particular model may cause the model to assign higher selection scores to content items that are novel in particular ways.

33 Claims, 9 Drawing Sheets

MEDIA CONTENT RANKINGS FOR DISCOVERY OF NOVEL CONTENT

TECHNICAL FIELD

Embodiments relate to the field of media content recommendation and, more specifically, to methods of ranking media content items to encourage discovery of new or different content.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Media content may be streamed from, or downloaded to, user devices such as a mobile computing device or a set-top box coupled to a television. The media content, which may include movies, television shows, or music, may be stored at a remote content system and may be presented at the user device in response to a user request. The catalog of media content items available to the user is often vast. To enable the user's selection of media content items for consumption, media content systems often present catalog information identifying media content items available to the user from the catalog of media content items. The catalog information may be in the form of a graphical user interface containing a various thumbnail or "box art" images, where each thumbnail image identifies a particular media content item of the catalog. Users may peruse the catalog information to select media content items for consumption.

The catalog information may be ordered in a particular manner, and the ordering may be customized to a particular user. Media content systems would benefit if the catalog information presented to the user increased user interest and satisfaction with respect to the media content items offered by the content provider system. Although recommendation systems have been available, they tend to recommend content items that are closely related or even the same as content items that the user may have previously viewed, rather than truly new or different content. For example, when a user has viewed a first episode of a particular television series, a recommendation system may tend to recommend viewing of other episodes of the same television series rather than a completely different series, media item or program.

SUMMARY OF THE INVENTION

The appended claims serve to summarize the invention.

DESCRIPTION OF EXAMPLE EMBODIMENTS

Figure 1A:
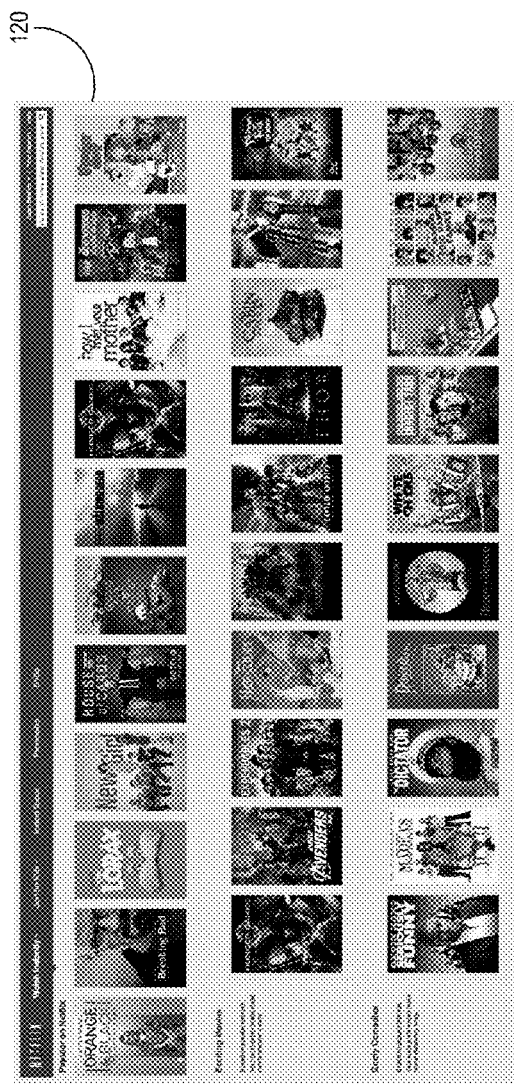
FIG. 1A illustrates an example of personalized catalog information generated for a particular user.

Methods for ranking media content items for discovery of novel content are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Determining a Selection Score Prediction Model
4.0 Using a Selection Score Prediction Model
5.0 Implementation Mechanisms—Hardware Overview
6.0 Extensions and Alternatives
7.0 Other Aspects of Disclosure
   1.0 General Overview A content provider system may generate a personalized ranking of media content items for a particular user. The content provider system may determine selection scores for each of a plurality of media content items offered by the content provider system and may generate a personalized ranking of media content items for a user according to the selection scores. The selection scores may be determined using a selection score prediction model that calculates a predicted selection score for a particular combination of a media content item and a user based on feature values associated with the combination of the media content item and the user. The feature values may indicate properties of the media content item, the particular user, or the particular user's relationship with the content item, including information about the novelty of the media content item with respect to the user. The selection score prediction model may be trained with sample user consumption data points representing various combinations of media content items and users. The data point information evaluated during the training of the model, such as user consumption values determined based in part on how novel the corresponding item is to the corresponding user and feature values indicating how novel the corresponding item is to the corresponding user, may cause the model to assign higher selection scores to content items that are novel in particular ways and are likely to be selected for consumption by the respective user.

A content provider system may cause catalog information identifying various media content items to be presented at a user device and the display of catalog information items may correspond to the determined ranking of the corresponding media content items. For example, the catalog information items may be thumbnail images representing various movies or shows, and the thumbnail images may be ordered according to a ranking of the respective movie or show that is represented by a particular thumbnail image. In another embodiment, the catalog information corresponding to the higher-ranked media content items (i.e. content items with high selection scores) may be displayed more prominently than catalog information corresponding to the lower-ranked media content items. For example, the thumbnail images representing higher-ranked content items may be larger than the thumbnail images representing lower-ranked content items.

Such a display of catalog information, where content items with higher selection scores are displayed first or more visibly, may encourage users to discover new media content that is likely to be enjoyed by the user and is also novel to the user. The exploration of different content is likely to increase a user's enjoyment of the media content system and increase the duration of his interaction with the media content system.

FIG. 1A illustrates an example of personalized catalog information generated for a particular user. Catalog information 120 is ordered according to a ranking that is determined without considering item novelty. For example, the ordering of thumbnail images within catalog information 120 may correspond to content item rankings that are determined based solely on a user's likelihood of selecting the media content items for consumption, without considering novelty factors.

Figure 1B:
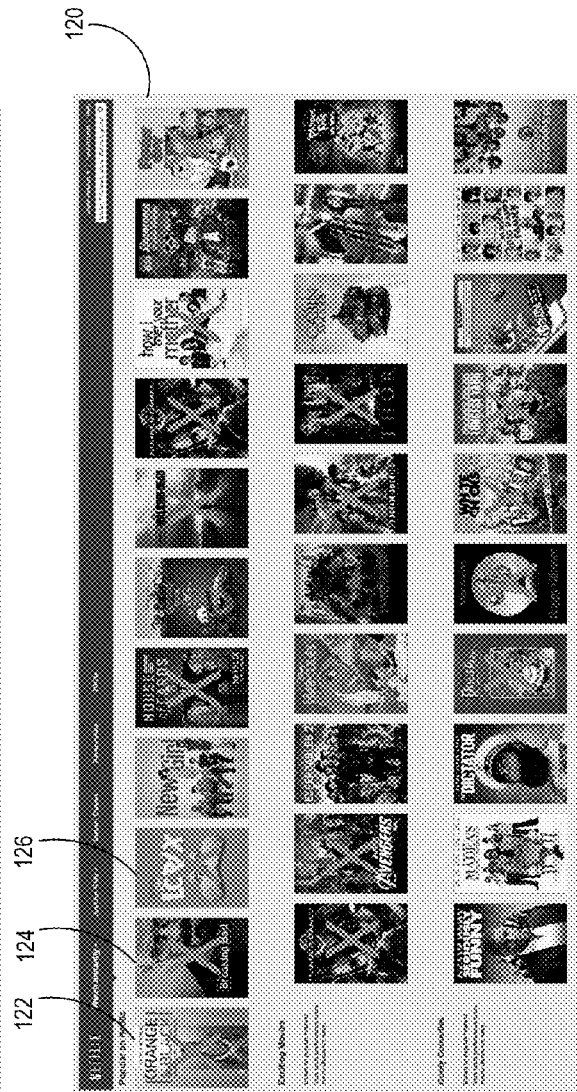
FIG. 1B illustrates the same catalog information with annotations representing content that has already been consumed by the user.

FIG. 1B illustrates the same catalog information with annotations representing content that has already been consumed by the user. As indicated by the overlaid "X" symbols, many media content items including the media content items corresponding to thumbnail images 122, 124, 126 are content items that have already been consumed by the user, or are not sufficiently novel in some other respect. A content provider system, which produces catalog information 120, may recommend an episode of a particular TV show first in a list of media content recommendations despite the user having already seen a different episode of the TV show. For example, thumbnail 122, which represent the TV show "Orange Is the New Black," may be ranked first in the catalog information despite the user having already viewed other episodes of the TV show "Orange Is the New Black."

As illustrated by FIG. 1A and FIG. 1B, non-novel content is likely to be ranked highly in ranking systems that only rank content items based on the predicted likelihood that the user will select to consume the material. However, a system that also considers content novelty in the ranking methodology and thus causes novel media content items to be ranked higher than non-novel content items may be more beneficial to a user than a system that does not differentiate based on novelty. For example, in such a system, the media content items that are recommended first may each be episode of a different TV show, where the user has not seen any episode of any of the different TV shows. A user would typically be aware of the existence of other episodes of a previously watched TV show, and would not require the assistance of a media content recommendation system to learn, or be reminded, of the TV show's existence.

2.0 Structural and Functional Overview

Figure 2:
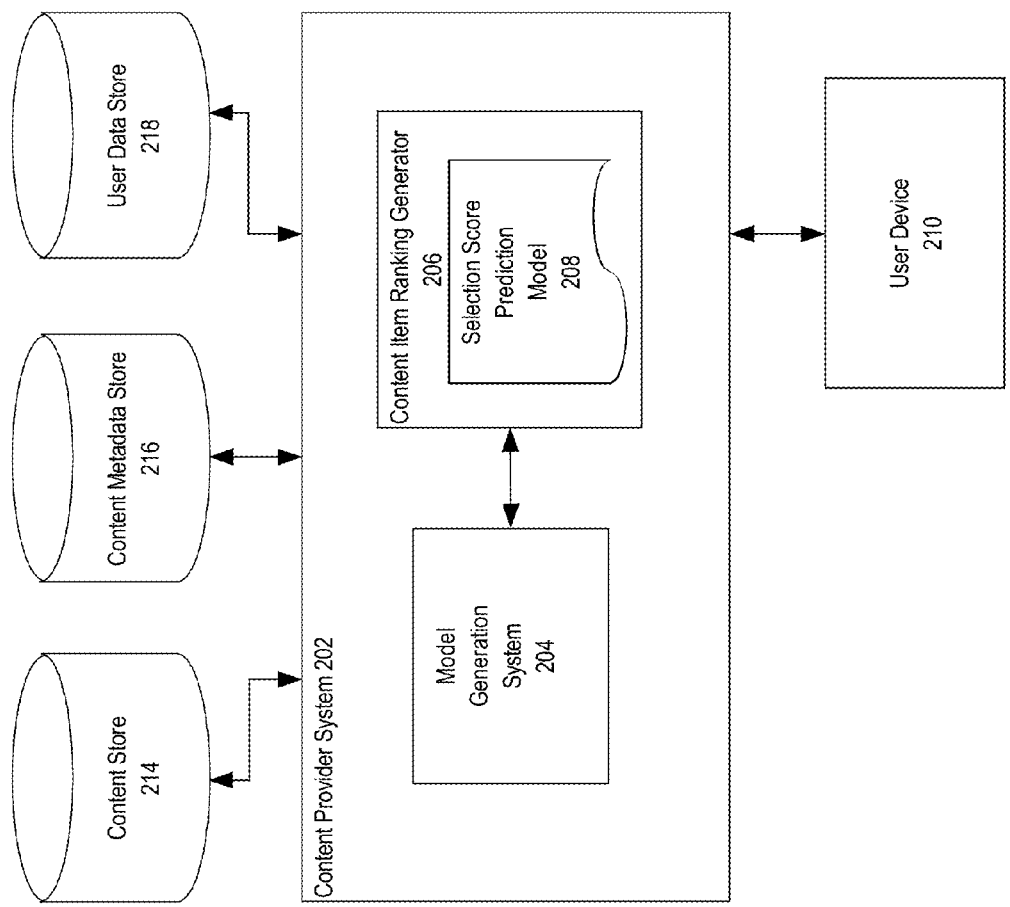
FIG. 2 illustrates an example system that provides media content and media content recommendations.

FIG. 2 illustrates an example system that provides media content and media content recommendations. Content provider system 202 may provide various media content items from a catalog of media content items to user device 210. The media content items may include media items such as videos, music, photos, or text. The media content items may be movies, television shows, news items, web pages, or books. User device 210 may be any device capable of receiving or playing the media content including, but not limited to, personal computers, smartphones, tablet computers, processor-equipped televisions, set-top boxes, game consoles, digital video recorders.

The content may be stored at content store 214, which may be communicatively coupled to content provider system 202. Content provider system 202 may cause content to be streamed or downloaded to user device 210 from the content store 214, either directly or through content provider system 202.

Content provider system 202 may also determine catalog information for display and cause the catalog information to be displayed at user device 210. The catalog information may include information about a plurality of media content items, each of which may be selected for consumption from a catalog of media content items.

Content provider system 202 may comprise content item ranking generator 206, which may rank the plurality of media content items. The catalog information displayed at user device 210 may be ordered according to the ranking of the plurality of media content items. For example, the catalog information may include media content item summaries or thumbnails, each of which pertains to a particular media content item and the media content item summaries or thumbnails may be ranked according to the determined ranking of the corresponding media content items.

Content provider system 202 may comprise model generation system 204, which generates selection score prediction model 208. Selection score prediction model 208 may be used to determine predicted selection scores for a plurality of content items. Content item ranking generator 206 may determine the predicted selection scores for the media content items based on selection score prediction model 208 and may rank the plurality of media content items according to the determined predicted selection scores.

Content provider system 202 is communicatively coupled to user data store 218, which may comprise information about a user associated with user device 210, and/or other users, which may be associated with other devices. Content provider system 202 may be communicatively coupled to content metadata store 216, which may comprise information about media content items included in the media catalog. Content item ranking generator 206 may determine the predicted selection scores for media content items based in part on user information retrieved from user data store 218, content information retrieved from content metadata store 216, and selection score prediction model 208. User information retrieved from user data store 218 and/or content information retrieved from content metadata store 216 may comprise information about user interactions with various content items, including information indicating novelty of the content items with respect to one or more users. Content provider system 202 may be capable of determining user interactions with catalog information presented at user devices such as user device 210. For example, content provider system 202 may determine which media content items were played or displayed at user device 210, how long the media content items were played or displayed for, which media content items were added to a queue at user device 210, and/or which media content items were rated at user device 210.

Content provider system 202 may include model generation system 204, which may generate selection score prediction model 208. Model generation system 204 may determine selection score prediction model 208 based on sample user consumption data retrieved from content metadata store 216 and/or user data store 218.

3.0 Determining a Selection Score Prediction Model

Figure 3:
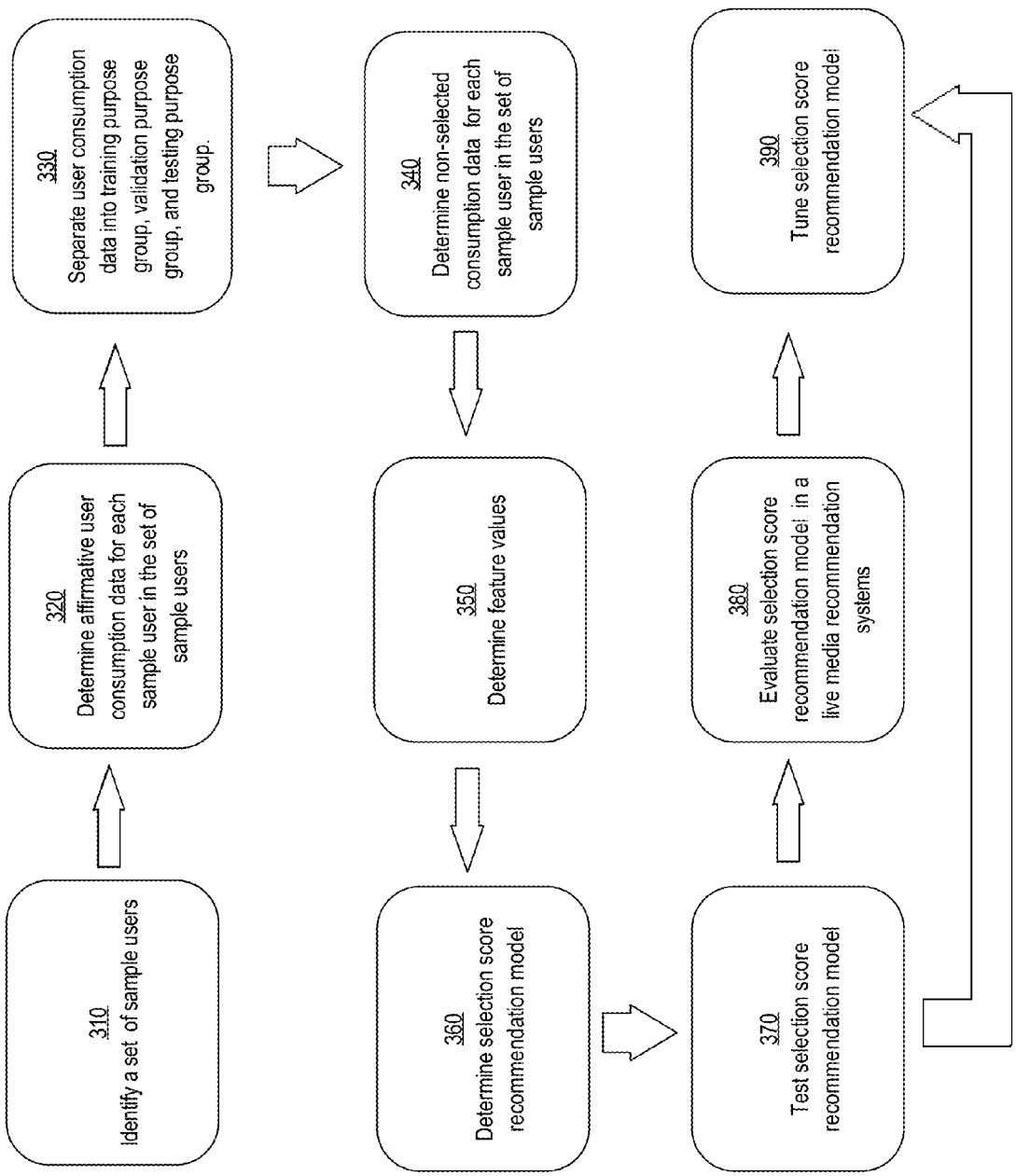
FIG. 3 illustrates an example process for determining and testing a selection score prediction model.

FIG. 3 illustrates an example process for determining and testing a selection score prediction model. The process may be performed by model generation system 204 to generate and test selection score prediction model 208. At block 310, a set of sample users are identified. The set of sample users may be identified by retrieving user information from user information data store 218. In an embodiment, each of the processes described in connection with the functional blocks of FIG. 3, FIG. 5, FIG. 6, FIG. 7 may be implemented using one or more computer programs, other software elements, and/or digital logic in any of a general-purpose computer or a special-purpose computer, while performing data retrieval, transformation and storage operations that involve interacting with and transforming the physical state of memory of the computer.

At block 320, affirmative user consumption data is determined for each sample user in the set of sample users. The affirmative user consumption data may identify content items played or displayed at a user device associated with the sample user in a particular time period, content items selected for consumption by the sample user in a particular time period, or other user consumption information. The other user consumption information may include, for each of a plurality of content items, information about one or more instances of the content item being selected for consumption such as the dates at which the content item was selected for consumption and whether each instance was a selection of the content item for consumption. The affirmative user consumption data may be collected from user data store 218. In some embodiments, the sample user data and sample user consumption data identify user consumption observed by content provider system 202.

At block 330, the affirmative user consumption data is separated into three different groups, including data to be used for training purposes ("training data"), data to be used for validation purposes ("validation data"), and data to be used for testing purposes ("testing data"). At block 340, non-selected consumption data is determined for each sample user in the sample set of users, where the non-selected consumption data identifies content included in the catalog that was not selected for consumption by the sample user. The non-selected consumption data may also be separated into three different groups, including data to be used for training purposes, data to be used for validation purposes, and data to be used for testing purposes.

A set of sample user consumption data points may be determined based on the affirmative user consumption data and the non-selected consumption data. The sample user consumption data points may be used for determining a selection score prediction model. In an embodiment, a sample user consumption data point represents a combination of a sample user and a particular identified media content item at a particular time. A selection score prediction model may be determined based on a plurality of sample user consumption data points associated with a variety of users. The set of sample user consumption points may be selected to ensure that the subset of sample user consumption data points associated with each particular user comprises an equal number of data point associated with content selected for consumption by the particular user and content not selected for consumption by the particular user. Such an approach may ensure that the selection score prediction model is determined on the basis of a balanced set of data points.

At block 350, for each sample user, feature values are determined for each sample user consumption data point in the set of sample user consumption data points. The feature values for each data point may indicate properties of the particular media content item corresponding to the data point, properties of the particular user corresponding to the data point, or the particular user's relationship with the particular content item, including information about the novelty of the particular media content item with respect to the particular user. The sample user consumption data points and the associated feature values may be the data points used to train selection score prediction model 208.

At block 360, the selection score prediction model is determined based on information about the sample user consumption data points. The selection score prediction model may be a model that is trained to accurately predict whether a particular content item is novel to a user and whether the content item is selected for consumption by the user. The selection score prediction model may predict such information based on feature values describing properties of the content item, user, and relationship of the user with the content item, which may be received as input during execution of the model. Data points corresponding to both media content items consumed by the user and content items not consumed by the user may be used to train the selection score prediction model.

At block 370, the selection score prediction model is tested to determine how accurately the model predicts the content items that are selected for consumption by the user and are also novel with respect to the user. The selection score prediction model may be tested by comparing the content item ranking generated based on the model with the sample data used for testing purposes. The validation data and the testing data may be used as sample data. The validation data may be used to select the best performing selection score prediction models. The best performing selection score prediction models may be further tested using the testing data.

At block 380, the determined selection score prediction model 208 is evaluated in a live media recommendation system. For example, features values for a variety of sample content items associated with a particular user may be calculated and provided as input to a determined selection score prediction model. The content items may subsequently be ranked based on the selection scores determined for each of the content items by the prediction model. The ranking of content items may then be compared with actual behavior of the particular user to determine if the ranking is sufficiently correlated with the content items that are selected first by the user and that are novel. For example, content provider system 202 may determine that the user selected a first content item for consumption before a second content item, or that the first content item was selected for consumption whereas the second content item was not. Content provider system 202 may evaluate the selection score prediction model by determining whether the first content item was ranked higher than the second content item. New versions of the selection score prediction model may be compared with prior version to determine if the new version improves the recommendations provided by the content provider system.

In some embodiments, content provider system 202 evaluates how satisfied the user is with the content items that were recommended to him, or which content items the user selects for consumption, and how those content items are ranked in the content item ranking generated based on the selection score prediction model being tested. At block 390, the parameters of the selection score prediction model may be tuned based on the results of testing the selection score prediction model with sample data as described in relation to block 370, evaluating the selection score prediction model in a live media recommendation system as described in relation to block 380, or both.

Figure 4:
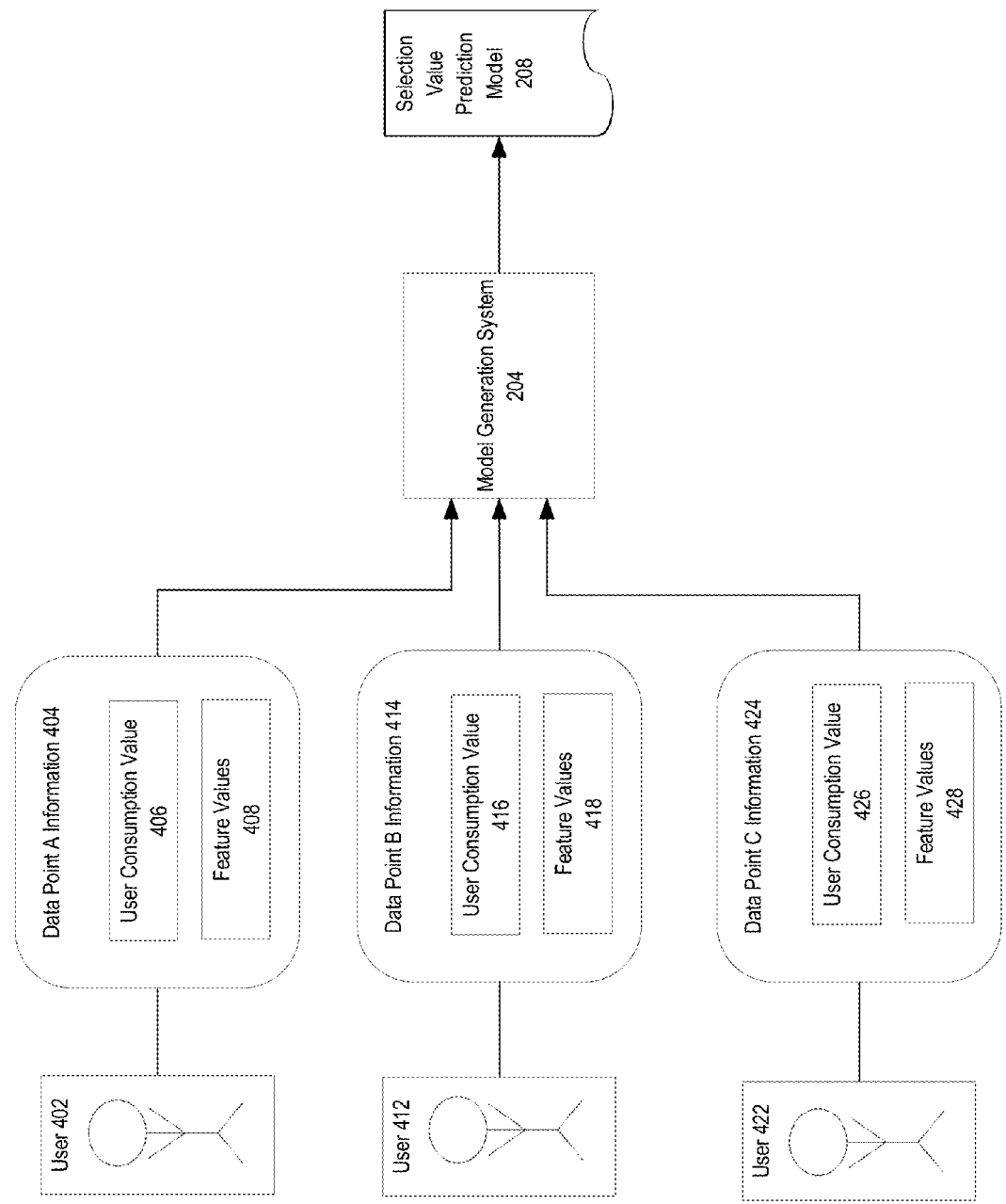
FIG. 4 is a diagram illustrating information that may be utilized by a model generation system to generate a selection score prediction model.

FIG. 4 is a diagram illustrating information that may be utilized by a model generation system to generate a selection score prediction model. The selection score prediction model may be used to determine a predicted selection score for an input media content item and an input user.

Model generation system 204 may determine selection score prediction model 208 based on user consumption data. The user consumption data may include information related to a plurality of sample user consumption data points, including data point A information 404, data point B information 414, data point C information 424, which respectively comprise information about data points A, B, and C.

The data point information for each data point may include a user consumption value for the data point and features values for the data point. For example, user consumption values 406, 416, and 426 are consumption values for data points A, B, and C respectively. Feature values 408, 418, and 428 are feature values for data points A, B, and C respectively. Although not necessary, one or more of the data points may be associated with a separate user. For example, data point A may be associated with user 402, data point B may be associated with user 412, and data point C may be associated with user 422.

Figure 5:
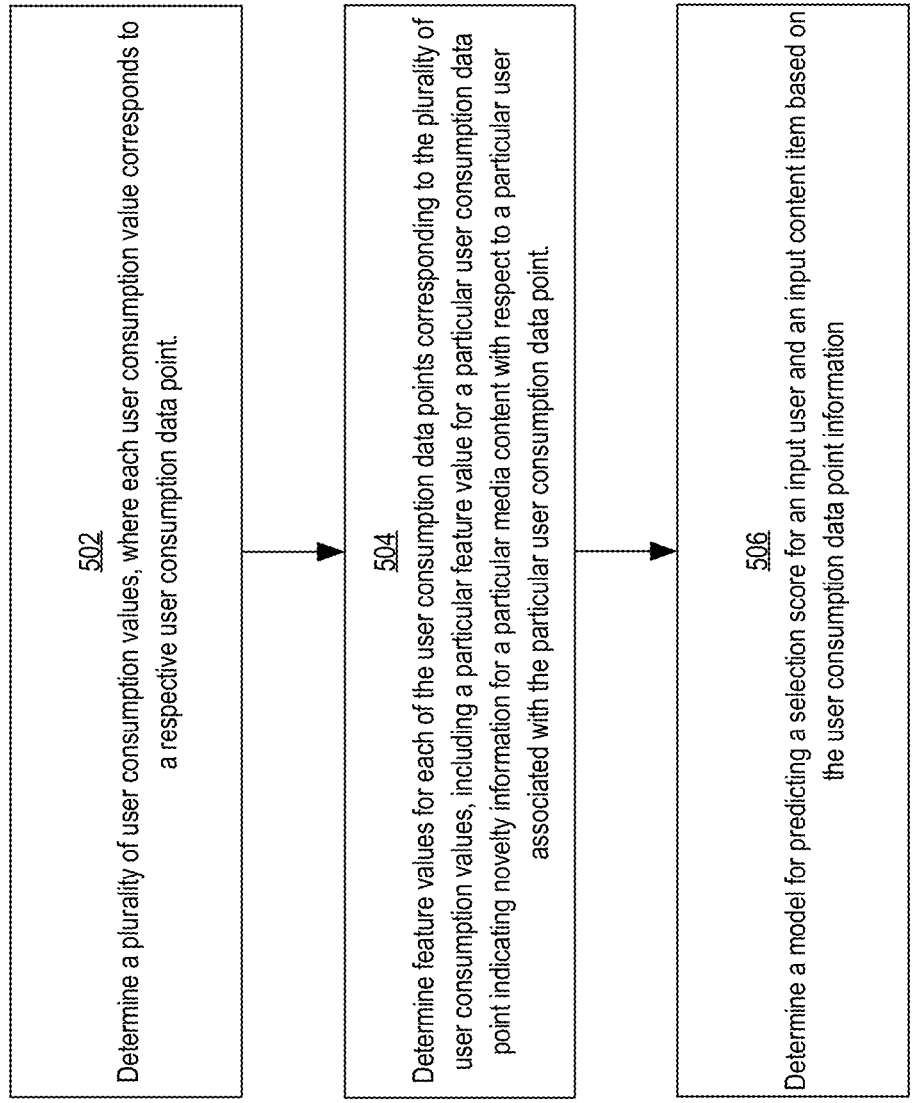
FIG. 5 illustrates an example process for determining a selection score prediction model based on user consumption data.

FIG. 5 illustrates an example process for determining a selection score prediction model based on sample user consumption data. The process of FIG. 5 may be performed at model generation system 204 and the process may generate selection score prediction model 208. The sample user consumption data may comprise information about various content items selected for consumption by various users and information about various content items not selected for consumption by the various users. In some embodiments, the sample user consumption data is information collected by the same content provider system that generates the ranking of media content items and describes actual user consumption activities by actual users.

At block 502, a plurality of user consumption values are determined, where each user consumption value corresponds to a respective sample user consumption data point. In an embodiment, each user consumption data point of the plurality of sample user consumption data points represents a particular combination of a corresponding media content item and a corresponding user. The sample user consumption data point may be associated with a user consumption value, which may indicate whether the corresponding media content item is novel with respect to the corresponding user and/or whether the corresponding user selected the corresponding media content item for consumption. User consumption data points and/or user consumption values may be determined by accessing user data store 218, which may include information about the content items that were selected for consumption by a plurality of users.

Although novelty may be assessed differently according to different embodiments, in one embodiment, a media content item is determined to be novel with respect to a user when the user has never selected the media content item for consumption before an action corresponding to the user consumption data point. For example, a particular data point may represent a combination of a particular user and a particular movie. The particular data point may correspond to a particular user selection to consume the particular media item. The user consumption value corresponding to the data point may be determined based in part on novelty information such as whether the user had selected to watch the particular movie before the particular user selection to watch the particular movie.

In another embodiment, novelty may require that the corresponding media content item not be selected for consumption within a particular time period, such as the ninety (90) days prior to a selection of the corresponding media content. In yet another embodiment, novelty may require that the past particular number of content selection interactions with catalog information provided by content provider system 202 not include the selection of the corresponding media content item for consumption. For example, content provider system 202 may examine the last four hundred (400) content selection interactions with the catalog information that occurred prior to the selection of the media item for consumption to determine whether the selection of the corresponding media content item was novel.

In some embodiments, novelty of the corresponding media content item is determined based on interactions of the corresponding user with different media content items that are related to the corresponding media content item. For example, according to an embodiment, if the corresponding content item is a part of a series, the corresponding content item is only novel with respect to the corresponding user if the corresponding user has not previously selected for consumption any content item that is part of the same series. A series may include all episodes of a particular show, or all episodes of a particular season of a show, or all movies belonging to the same series.

In another embodiment, model generation system 204 examines the corresponding user's interactions with different media content items that are determined to be similar or otherwise related to the media content item corresponding to the user consumption data point. For example, if the corresponding user has selected another content item for consumption, where the other content item is directed by the same director as the media content item corresponding to the user consumption data point, the corresponding media content item may be determined to be non-novel with respect to the corresponding user. In other embodiments, content items may be deemed similar based on other factors, such as genre of the content item or actors featured in the content item.

The particular user actions that constitute selection of a media content item for consumption may also vary according to different embodiments. In some embodiments, the media content item must play or be displayed at a user device associated with the user to constitute a user selection of the media content item for consumption. In other embodiments, a user selects a media content item for consumption by selecting an option to play or display the media content item, rate the media content item, and/or add the media content item to a queue for later consumption. Some embodiments may require that the media content item be played or displayed for at least a particular amount of time for the playing or displaying to constitute a user's selection the media content item for consumption.

In an embodiment, the user consumption value is a binary value. For example, the user consumption value for a data point may be a favorable user consumption value such as "1" if the media content item corresponding to the data point is determined to be sufficiently novel with respect to the corresponding user and if the user action corresponding to the data point is an action that constitutes the selection of the media content item. The user consumption value may be an unfavorable user consumption value such as "0" if either the media content is deemed to be insufficiently novel with respect to the corresponding user, or if no use selection of the media content item has occurred. In other embodiments, the user consumption value may be a non-binary value.

A favorable user consumption value for a particular data point may indicate to model generating system 204 that the resulting selection score prediction model 208 should predict higher selection scores for data points whose feature values are similar to the particular data point. The resulting selection score prediction model will predict a high selection score for a combination of a media content items and a user if the feature values associated with the combination are similar to the features values of the data points that were associated with favorable user consumption values.

Novelty and selection of media content item for consumption may be measured in binary terms or non-binary terms. For example, the user consumption value may be determined based on novelty values that indicate novelty and item selection score that indicates whether the content item was selected for consumption. The novelty value and the item selection score may be binary values that respectively indicate whether the corresponding item is novel with respect to the corresponding user and whether the corresponding item was selected for consumption by the corresponding user. In another embodiment, either or both of the novelty value and the item selection score may be non-binary values. The novelty value may indicate the corresponding content item's level of novelty with respect to the corresponding user. For example, a novelty value of "1" may indicate that the user has not selected the content item for consumption in the last year, a novelty value of "0.5" may indicate that the user has not selected the content item for consumption in the last ninety (90) days but has selected the content item for consumption before the ninety (90) day period, and a novelty value of "0" may indicate that the user has selected the content item for consumption in the last ninety (90) days.

At block 504, feature values for each of the user consumption data points corresponding to the plurality of user consumption values are determined. The set of determined feature values includes a particular feature value for a particular user consumption data point that indicates novelty information for a particular media content item with respect to a particular user associated with the particular user consumption data point. The feature values may be determined by accessing content metadata store 216, which may comprise information about media content items included in the media catalog, and/or user data store 218, which may comprise information about one or more users of content provider system 202.

A user consumption data point may be associated with a plurality of feature values, where each feature value indicates a property of the user corresponding to the data point, a property of the content item corresponding to the data point, or a property of the user's relationship with the content item, including information about the novelty of the media content item with respect to the user. For example, feature values may indicate popularity of the corresponding media content item, predicted rating of the corresponding media content item, a number of media content items that are included in the corresponding user's media consumption queue, or other information. Each of the above properties may be represented by separate feature values.

Each user consumption data point may represent a particular user selection to consume a corresponding media item and the feature values may indicate properties at the time of the particular user selection. For example, a particular user consumption data point may correspond to a particular user selection to watch a particular media content item. The particular user selection may have occurred at a particular date and a feature values associated with the particular user consumption data point may indicate the popularity of the particular media content item at the particular date.

In some embodiments, the set of feature values includes feature value(s) indicating novelty of the corresponding media content item with respect to the corresponding user. There may be a plurality of novelty-related feature values that each indicates different information about the novelty of the corresponding media content item with respect to the corresponding user. For example, one feature value may indicate whether the user has watched the media content item within the last week and another feature value may indicate whether the user has watched the media content item more than one time.

Features may be represented as questions and the feature values for the features may be numerical answers to the questions. For yes or no questions, the feature values may be represented as binary numbers. Example features may include:

Has the user watched the media content item?

How many minutes of the media content item has the user watched?

For a media content item that is an episode of a particular show, how many episodes of the show has the user watched?

For a media content item that is an episode of a particular show, has the user finished the last episode in the show?

For a media content item that is an episode of a particular show, what fraction of the total episodes in the show the user watched?

For a media content item that is an episode of a particular show, has the user watched over X % of the content of all episodes in the show?

What is the ranking of the media content item in a ranked list of media content items where media content items are ranked by when they were last watched, i.e. "recently watched rank"?

How many days has it been since the user last watched the media content item?

Has the user last watched the media content item in the past 7 days?

Has the user last watched the media content item over X days ago?

Has the user watched the media content item on only a single day?

Has the user watched the media content item and is it TV?

For a media content item that is an episode of a particular show, has the user only watched a single episode of the TV show?

For a media content item that is an episode of a particular show, has the user watched more than one episode of the TV show?

Is the media content item the last media content item the user watched?

Has the user watched the media content item more than once?

Has the user watched the media content item more than twice?

The above list is meant to be exemplary and other types of features are also contemplated. Although features values for each of the above features indicate novelty information, other feature values may indicate other properties of the media content item or the user including, but not limited to, popularity of the media content item among all users or a specific group of users and the activity level of the user.

As an example, a particular user consumption data point, such as data point A, may represent the combination of user 402 and the movie "Mission: Impossible II," which is the second movie in the Mission Impossible series. Feature values 408 corresponding to data point A may be represented as (0, 1, 5). Each of the three feature values may refer to a different property of the media content item, the user, or the user's relationship with the content item. For example, the first value of "0" may be a Boolean value indicating that the user did not watch the media content item in the last ten (10) days prior to a particular watching of the media content item. The second feature value may be a Boolean value of "1" indicating that the user has seen other media content items in the same series as the movie "Mission: Impossible II." The third feature value may indicate that the predicted rating of the movie is 5. User consumption value 406 corresponding to data point A may be "1" indicating that user 402 watched the movie and that user 402 had not previously seen the movie before the particular watching of the particular movie. Other embodiments may include different feature values and/or a different number of feature values.

At block 506, a model for predicting a selection score for a combination of an input user and an input content item is determined based on the user consumption data point information. The user consumption data point information may include the user consumption value and the feature values associated with the data point.

In an embodiment, the model comprises one or more computer programs or other software elements that are configured to perform data transformations equivalent to an expression that is of the following form:

$$\text{SelectionScore}(u,c) = b + \Sigma w_i * f_i(u,c) \quad \text{Model Form 1}$$

In Model Form 1, the variable "u" represents a particular user and the variable "c" represents a particular media content item. The variable $f_i(u,c)$ represents the feature value for feature "i" with respect to the particular user and the particular media content item, and $w_i$ represents the weight value corresponding to feature "i". The variable "b" represents a constant value that may be included in some models. As illustrated, in some embodiments, the model determines a selection score for a media content item and a user based on a plurality of feature values corresponding to the combination of the media content item and the user. The predicted selection score for a particular combination of a particular user and a particular media content item may be determined by summing together a plurality of weighted feature values corresponding to the combination of the user and the media content item and adding the constant value.

An example model of the form of Model Form 1 is as follows:

$$\text{SelectionScore}(u,c) = 0.2 * f_1(u,c) + 9 * f_2(u,c) + \ldots \\ + 0.7 * f_3(u,c) + 7 \quad \text{Model 1}$$

Determining selection score prediction model 208 may comprise determining the offset value and the weight values that are to be applied to the different features. In an embodiment, model generation system 204 determines selection score prediction model 208 by performing predictive analytics upon sample data point information about a plurality of user consumption data points, which is provided as input to model generation system 204. The sample data points may each represent a combination of a media content items and a user and the data point information for each of the data points may include a plurality of feature values corresponding to the combination and a user consumption value corresponding to the combination.

Model generation system 204 may be a statistical classification algorithm and the selection score prediction model 208 determined by the model generation system may be a classifying function. The data point information may be used as training information for training the statistical classification algorithm, and the statistical classification algorithm may determine a mathematical expression that describes the relationship between the plurality of feature values and the user consumption values included in the data point information. The user consumption value may be designated as the dependent variable and the feature values may be designated as the independent variables during the classification. An example of the mathematical expression that may be a result of a statistical classification algorithm, in one embodiment, is:

$$\text{ConsumptionValue}(u,c) = 0.2 * f_1(u,c) + 9 * f_2(u,c) + \ldots \\ + 0.7 * f_3(u,c) + 7 \quad \text{Example Mathematic Expression 1}$$

Example Mathematic Expression 1 may be used to predict the consumption value of a user and content item based on features values $f_1$, $f_2$, and $f_3$. Content provider system 202 may use the mathematical expression to determine selection scores for input media content items and users by solving for the consumption value after determining the feature values, and equating the resulting consumption value to a selection score.

The classifying function may be a regression function. In other embodiments, the statistical classification algorithm may construct decision tree or ensembles methods to determine the classifying function. Each of the algorithm and/or expression may comprise one or more computer programs or other software elements that are configured to execute operations equivalent to the algorithm and/or expression.

Figure 8:
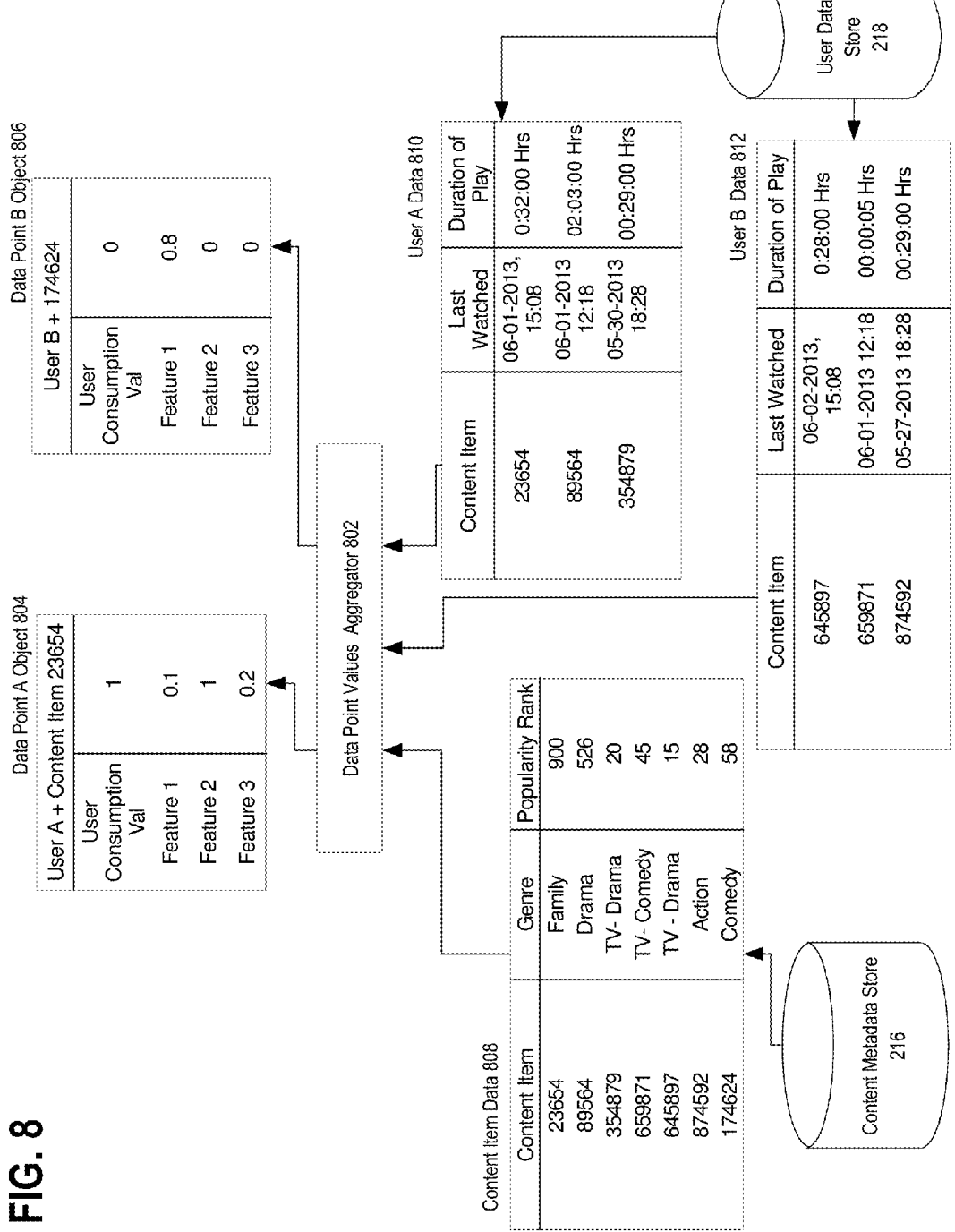
FIG. 8 illustrates information stored in an example content metadata store and an example user data store and data point information obtained from the example content and metadata stores.

FIG. 8 illustrates information stored in an example content metadata store and in an example user data store and data point information obtained from the example content and metadata stores. Data point values aggregator 802 may be a module of content provider system 202 that collects data point information from content metadata store 216 and user data store 218. The data point information collected from content metadata store 216 and user data store 218 may be used by model generation system 204 to train selection value prediction model 208.

Content metadata store 216 may store content metadata for each of a plurality of content items, such as content item data 808, which indicates, for each content item, the genre of the content item and the popularity rank of the content item. User data store 218 may store user information about user consumption or interaction with content items. For example, User A data 810 identifies the last three content items consumed by User A, the date of last consumption, and the duration of play.

In an embodiment, user data store 218 and content metadata store 216 are databases to which content provider system 202 is communicatively coupled. Data point values aggregator 802 may obtain user data from user data store 218 and content item data from content metadata store 216 and may determine feature values and user consumption values based on information collected from both data stores. Data point values aggregator 802 may package the feature value and user consumption value into separate data point objects, such as data point A object 804 and data point B object 806, each representing a particular combination of a user and content item. User data store information and content metadata store information may both identify the content items to which the particular information corresponds by identifying a content ID, which each uniquely identify a content item. Data point values aggregator 802 may join information from the two stores based on the unique content IDs.

Each data point object may identify a user consumption value and a plurality of feature values associated with the combination of the respective data point and content item. The data point object may include may include different feature values, but the feature values of the different data point objects may represent information about the same properties. For example, the value associated with "Feature 1" for data point A object 804 and data point B object 806 may both indicate how popular the corresponding media content items are. Similarly, data point values aggregator 802 may determine user consumption values according to the same methodology for both data point A objet 804 and data point B object 806. For example, the user consumption value of each data point may indicate whether the corresponding user has consumed the corresponding content item within the last 30 days. Data point aggregator 802 may provide the determined data point objects to model generation system 204 as a basis for training selection value prediction model 208.

4.0 Using a Selection Score Prediction Model

Figure 6:
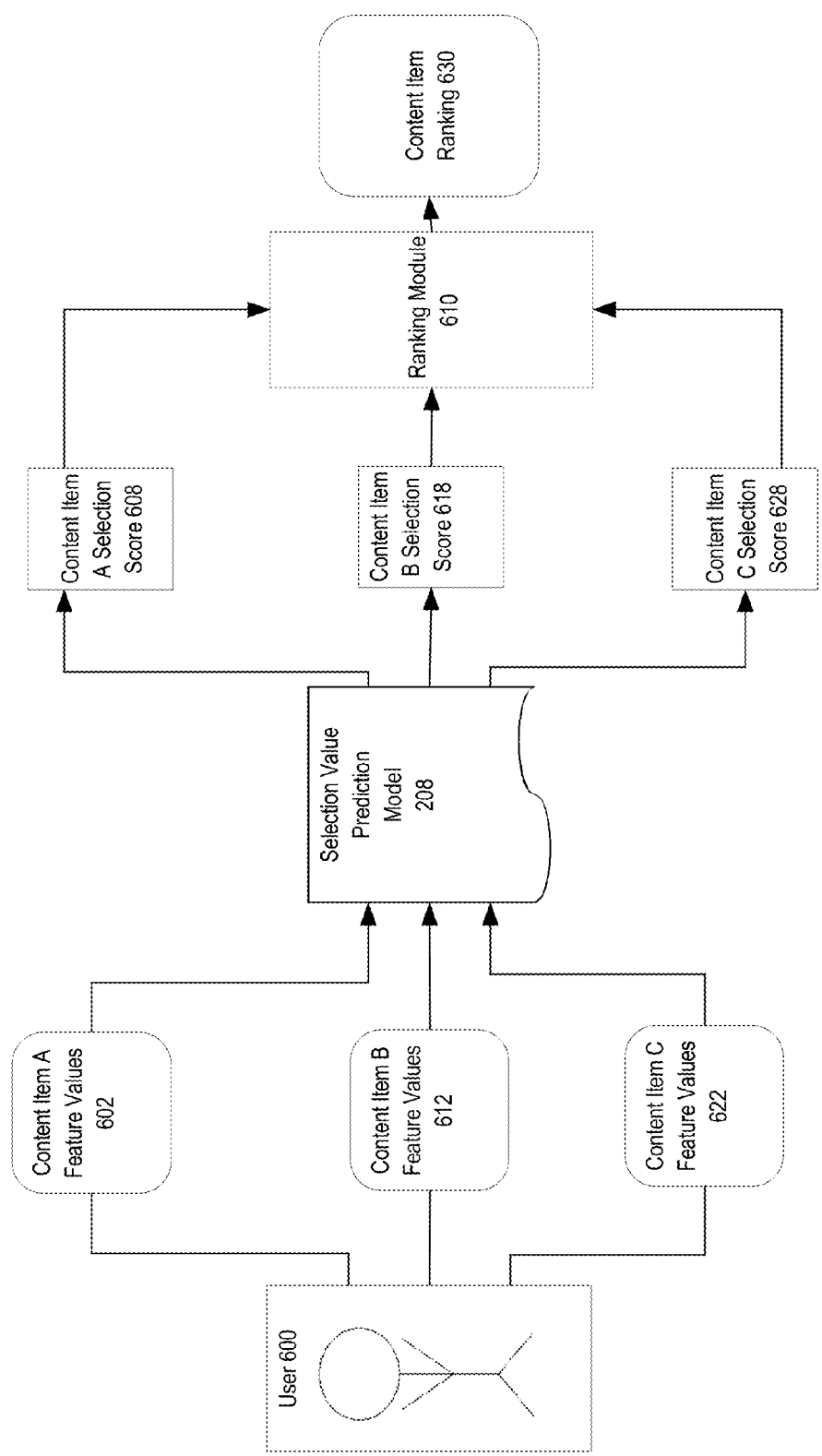
FIG. 6 is a diagram illustrating information that may be utilized by an example content item ranking generator to determine a content item ranking.

FIG. 6 is a diagram illustrating information that may be utilized by an example content item ranking generator to determine a content item ranking. Content item ranking 630 may identify the ranking of various content items including content items A, B, and C. The ranking may be determined with respect to a single user, user 600. Content item ranking generator 206 may determine features values corresponding to each of the content items and may provide the features values as input to selection score prediction model 208. The feature values may include including content item A, feature values 602, content item B feature values 612, and content item C feature values 622.

Selection score prediction model 208 may determine a selection score for each content item based on the features values corresponding to the content item. The content item selection scores may include content item A selection score 608, content item B selection score 618, and content item C selection score 628. Ranking module 610 determines content item ranking 630 based on the selection scores. Ranking module 610 may rank the content items in order of their selection scores, with the content item having the highest selection score being ranked first.

Figure 7:
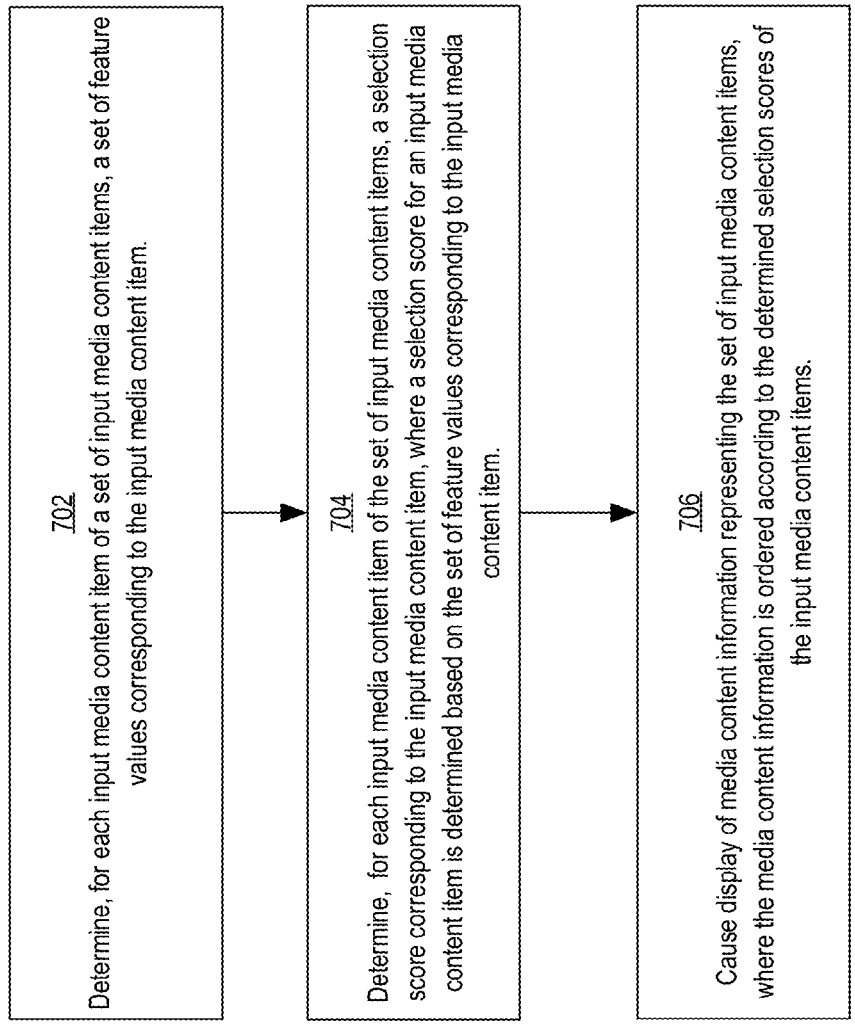
FIG. 7 is an example process for using a ranking of input media content items to display media content information.

FIG. 7 is an example process for using a ranking of input media content items to display media content information. The process of FIG. 7 may be performed at content item ranking generator 206. The input media content items may be ranked for purposes of determining catalog information to display to a user at user device 210 to enable selection of media content items for consumption.

At block 702, for each input media content item of a set of input media content items, a set of feature values corresponding to the input media content item are determined. The input media content items may be all or a subset of the media content items offered by content provider system 202. Content item ranking generator 206 may determine feature values by accessing information about the content items, information about the users, and/or information about interactions by the users with content items. Such information may be stored at data stores communicatively coupled to content item ranking generator 206 such as content metadata store 216 or user data store 218.

At block 704, for each input media content item of the set of input media content items, a selection score corresponding to the input media content item is determined. A selection score for an input media content item may be determined based on the set of feature values corresponding to the input media content item. Determining the selection score based on the respective set of feature values may include calculating the selection score based on one or more computer programs or other software elements that are configured to execute operations equivalent to a mathematical expression that indicates how the selection score is to be computed based on the feature values. The mathematical expression may be selection score prediction model 208.

At block 706, display of media content information representing the set of input media content items is caused, where the media content information is ordered according to the determined selection scores of the input media content items. The media content items may be ranked based on their selection scores. For example, catalog information comprising various thumbnail images may be displayed, where each thumbnail image identifies a particular media content item of the catalog. The thumbnail images may be ordered according to the ranking of their respective media content items, with the thumbnail images that correspond to highly ranked media content items appearing first.

As described according to some embodiments, the selection score for a media content item and a user depends in part on the novelty of the media content item with respect to the user. For example, the user consumption value, which may be utilized as a dependent variable during the training of selection score prediction model 108, depends in part on the novelty of the media content item with respect to the user. The user consumption value may be higher for media content items that are novel with respect to a particular user. In addition, the model as generated according to the processes described herein may cause the predicted selection score to be higher for novel content because feature values describing novelty properties of a media content item may be considered by the model in predicting the selection score.

The approaches described herein may result in content item rankings where non-novel content items are included in the rankings but, in some cases, are ranked lower than novel content items. Such an approach may provide better results than approaches where non-novel content items are eliminated from the ranking entirely because, in some cases, it may be beneficial to remind the user of the existence of a particular content item despite the fact that the content item is non-novel.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
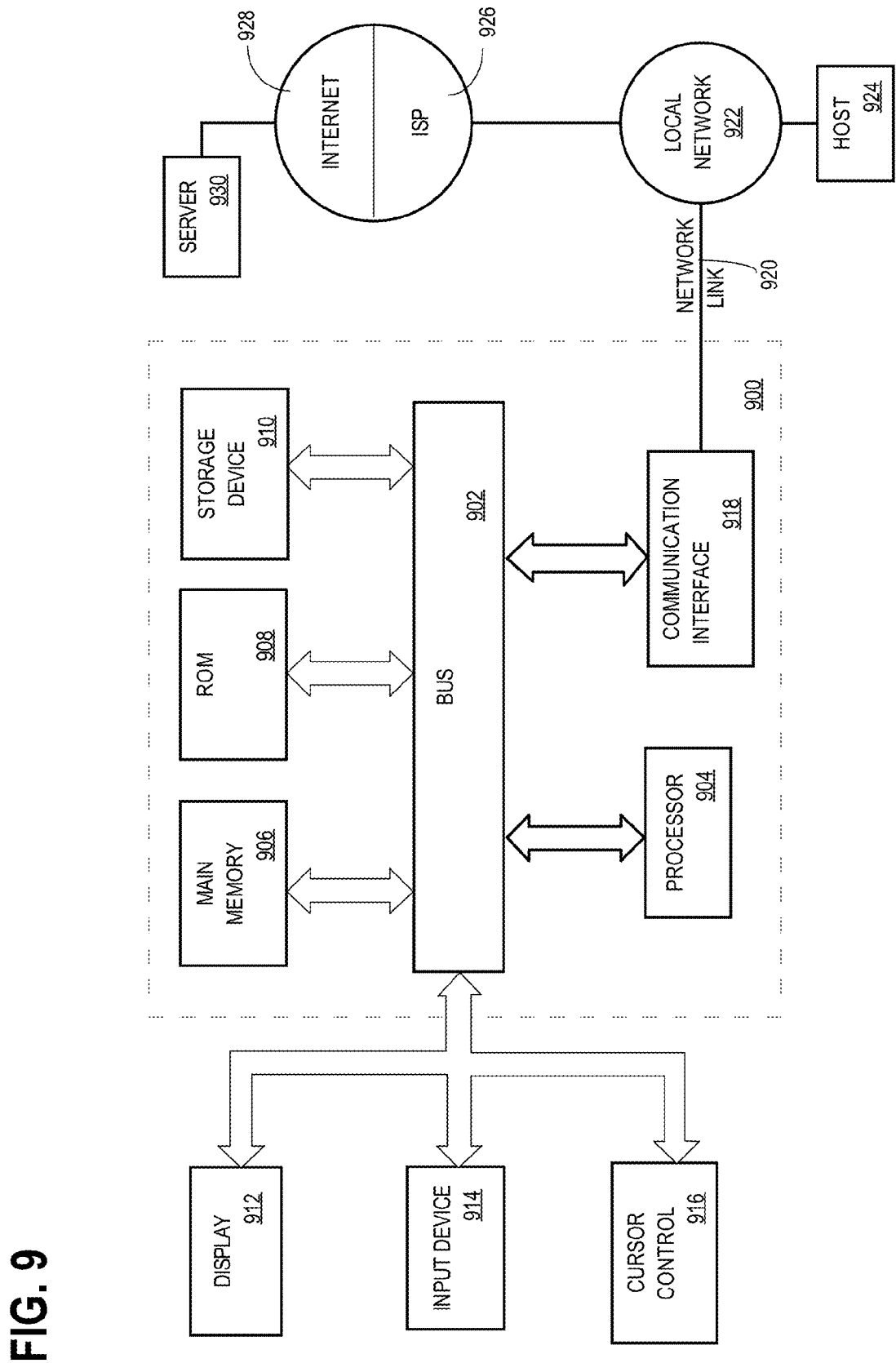
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT) or a liquid-crystal display (LCD), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

7.0 Other Aspects of Disclosure

Aspects of the subject matter described herein are set out in the following numbered clauses:

1. A method comprising: in a data processing system configured to generate personalized rankings of input media content items in a catalog: determining a plurality of user consumption values, wherein each of the user consumption values is associated with a user consumption data point, and wherein each user consumption data point is associated with a corresponding user and a corresponding media content item; wherein each of the user consumption values indicate a user consumption value with respect to: a user that corresponds to the user consumption data point associated with the user consumption value; and a media content item that corresponds to the data point associated with the user consumption value; determining feature values for each of the user consumption data points associated with the plurality of user consumption values, wherein the feature values include a particular feature value for a particular user consumption data point indicating novelty information for a particular media content item associated with the particular user consumption data point with respect to a particular user associated with the particular user consumption data point; determining, based on the plurality of user consumption values and the feature values, predicted selection scores for an input user and the input media content items; ranking the media content items in the catalog for the input user based on the predicted selection scores; wherein the method is performed using one or more processors.

2. The method of any of clause 1, wherein a certain user consumption value associated with a certain user consumption data point is determined based upon: certain novelty information indicating novelty of a certain content item corresponding to the certain user consumption data point with respect to a certain user corresponding to the particular user consumption data point; user consumption information indicating whether the certain content item was selected for consumption by the certain user.

3. The method of any of clause 1-2, wherein the novelty of the certain content item with respect to the certain user is determined based on novelty of a related content item with respect to the certain user, wherein the related content item is different than the certain content item.

4. The method of any of clause 1-3, wherein the certain novelty information indicates novelty of a similar content item with respect to the certain user, wherein the similar content item is different than the certain content item and is determined to be similar to the certain content item.

5. The method of any of clause 1-4, wherein the certain novelty information indicates at least one of: whether the certain content item was consumed for at least a particular amount of time; whether the certain content item was reviewed; whether an option to consume the content item was displayed to the input user; whether the certain content item was rated; or whether the certain content item was added to queue of content items for consumption.

6. The method of any of clause 1-5, wherein the certain novelty information is a non-binary novelty value indicating a level of novelty of the certain content item with respect to the certain user.

7. The method of any of clause 1-6, wherein the certain user consumption value is a certain binary value indicating that the certain content item is novel with respect to the certain user and that the certain user selected the certain content item for consumption.

8. The method of any of clause 1-7, wherein the feature values further include an additional feature value for the particular user consumption data point indicating further novelty information about the particular media content item with respect to the particular user, wherein the further novelty information is different than the novelty information indicated by the particular feature value.

9. The method of any of clause 1-8, wherein the feature values further include an additional feature value for the particular user consumption data point indicating popularity of the particular media content item with respect to users other than the particular user.

10. The method of any of clause 1-9, wherein determining the predicted selection scores comprises determining a regression function based on the feature values and the plurality of user consumption values, and wherein the regression function is an expression for calculating a predicted selection score for a corresponding input media content item and a corresponding input user.

11. The method of any of clause 1-10, wherein determining the predicted selection scores comprises determining a classification function based on the feature values and the plurality of user consumption values, and wherein the classification function is an expression for calculating a predicted selection score for a corresponding input media content item and a corresponding input user.

12. The method of any of clause 1-11, wherein determining the predicted selection scores comprises using a computational expression for calculating an output predicted selection score based on a set of input feature values.

13. The method of any of clause 1-12, wherein the computational expression identifies a plurality of weight values, wherein each weight value of the plurality of weight values corresponds to a respective feature and indicates a relative weight to be applied to an input feature value of the respective feature during calculation of the output predicted selection score.

14. The method of any of clause 1-13, further comprising causing display of media content information representing the media content items, wherein the media content information is ordered according to a result of the ranking.

15. The method of any of clause 1-14, wherein the user consumption data points, with which the plurality of user consumption values is associated, represent observed user consumption of media content items.

16. The method of any of clause 1-15, further comprising determining an unfavorable user consumption value for a certain user consumption data point associated with a certain user and a certain content item in response to determining that the certain content item was selected for consumption by the certain user; and that the certain content item was not novel with respect to the certain user.

17. A non-transitory computer-readable data storage medium storing one or more sequences of instructions which when executed cause one or more processors to perform any of the methods recited in clauses 1-16.

18. A computer program product including instructions that, when implemented on one or more processors, carries out any of the methods recited in clauses 1-16.

19. A computing device having a processor configured to perform any of the methods recited in clauses 1-16.

What is claimed is:

1. A method comprising:
   in a data processing system configured to generate personalized rankings of a first plurality of media content items in a catalog:
   determining a plurality of user consumption values, wherein each user consumption value of the plurality of user consumption values is associated with a user consumption data point of a plurality of user consumption data points, and wherein each user consumption data point is associated with a user and a media content item in a second plurality of media content items;
   determining, for each user consumption data point of the plurality of user consumption data points, a plurality of feature values associated with the user consumption data point, wherein the plurality of feature values include a particular feature value indicating whether the user associated with the user consumption data point consumed the media content item associated with the user consumption data point within a particular amount of time;
   training a selection value prediction model based on each feature value of the plurality of feature values associated with each user consumption data point of the plurality of user consumption data points;
   for each media content item of the first plurality of media content items, determining, based on the selection value prediction model, a predicted selection score for an input user and the media content item;
   ranking the first plurality of media content items in the catalog for the input user based on the predicted selection score for each media content item in the first plurality of media content items;
   wherein the method is performed using one or more processors.

2. The method of claim 1, wherein a certain user consumption value associated with a certain user consumption data point is determined based upon:
   certain novelty information indicating a novelty of a certain content item corresponding to the certain user consumption data point with respect to a certain user corresponding to the certain user consumption data point;
   user consumption information indicating whether the certain content item was selected for consumption by the certain user.

3. The method of claim 2, wherein the novelty of the certain content item with respect to the certain user is determined based on novelty of a related content item with respect to the certain user, wherein the related content item is different than the certain content item.

4. The method of claim 2, wherein the certain novelty information indicates novelty of a similar content item with respect to the certain user, wherein the similar content item is different than the certain content item and is determined to be similar to the certain content item.

5. The method of claim 2, wherein the certain novelty information indicates at least one of:
   whether the certain content item was consumed for at least a particular amount of time;
   whether the certain content item was reviewed;
   whether an option to consume the certain content item was displayed to the input user;
   whether the certain content item was rated; or
   whether the certain content item was added to queue of content items for consumption.

6. The method of claim 1, wherein, for each user consumption data point, the particular feature value included in the plurality of feature values is a non-binary novelty value.

7. The method of claim 1, wherein, for each user consumption data point, the particular feature value included in the plurality of feature values is a binary value.

8. The method of claim 1, wherein, for each user consumption data point, the plurality of feature values include an additional particular feature value indicating novelty information about the media content item with respect to the user associated with the user consumption data point, wherein the additional particular feature value is different than the particular feature value.

9. The method of claim 1, wherein, for each user consumption data point, the plurality of feature values further include an additional particular feature value indicating popularity of the media content item with respect to one or more users other than the user associated with the user consumption data point.

10. The method of claim 1, wherein the selection value prediction model is a regression function.

11. The method of claim 1, wherein the selection value prediction model is a classification function comprising a plurality of weights that respectively correspond with the plurality of feature values associated with the user consumption data point of the plurality of user consumptions data points.

12. The method of claim 1, wherein the selection value prediction model comprises a plurality of weight values.

13. The method of claim 12, wherein, for each media content item of the first plurality of media content items, determining the predicted selection score comprises summing a plurality of products, wherein each product in the plurality of products is based on a weight value of the plurality of weight values and a corresponding feature value in the plurality of feature values.

14. The method of claim 1, further comprising causing display of media content information representing the media content items, wherein the media content information is ordered according to a result of the ranking.

15. The method of claim 1, wherein each user consumption value of the plurality of user consumption values represents observed user consumption of the media content item associated with the user consumption data point that is associated with the user consumption value.

16. The method of claim 1, further comprising:
   determining an unfavorable user consumption value for a certain user consumption data point associated with a certain user and a certain content item in response to determining:
   that the certain content item was selected for consumption by the certain user; and
   that the certain content item was not novel with respect to the certain user.

17. A data processing system for generating personalized ranking of a first plurality of media content items in a catalog, the system comprising:
- a memory;
- one or more processors coupled to the memory and configured to:
- determine a plurality of user consumption values, wherein each user consumption value of the plurality of user consumption values is associated with a user consumption data point of a plurality of user consumption data points, and wherein each user consumption data point is associated with a user and a media content item in a second plurality of media content items;
- determine, for each user consumption data point of the plurality of user consumption data points, a plurality of feature values associated with the user consumption data point, wherein the plurality of feature values include a particular feature value indicating whether the user associated with the user consumption data point consumed the media content item associated with the user consumption data point within a particular amount of time;
- training a selection value prediction model based on each feature value of the plurality of feature values associated with each user consumption data point of the plurality of user consumption data points;
- for each media content item of the first plurality of media content items, determine, based on the selection value prediction model, a predicted selection score for an input user and an media content item;
- rank the first plurality of media content items in the catalog for the input user based on the predicted selection score for each media content item in the first plurality of media content items.

18. The data processing system of claim 17, wherein a certain user consumption value associated with a certain user consumption data point is determined based upon:
- certain novelty information indicating a novelty of a certain content item corresponding to the certain user consumption data point with respect to a certain user corresponding to the certain user consumption data point;
- user consumption information indicating whether the certain content item was selected for consumption by the certain user.

19. The data processing system of claim 18, wherein the novelty of the certain content item with respect to the certain user is determined based on novelty of a related content item with respect to the certain user, wherein the related content item is different than the certain content item.

20. The data processing system of claim 18, wherein the certain novelty information indicates novelty of a similar content item with respect to the certain user, wherein the similar content item is different than the certain content item and is determined to be similar to the certain content item.

21. The data processing system of claim 18, wherein the certain novelty information indicates at least one of:
- whether the certain content item was consumed for at least a particular amount of time;
- whether the certain content item was reviewed;
- whether an option to consume the certain content item was displayed to the input user;
- whether the certain content item was rated; or
- whether the certain content item was added to queue of content items for consumption.

22. The data processing system of claim 17, wherein, for each user consumption data point, the particular feature value included in the plurality of feature values is a non-binary novelty value.

23. The data processing system of claim 17, wherein, for each user consumption data point, the particular feature value included in the plurality of feature values is a binary value.

24. The data processing system of claim 17, wherein, for each user consumption data point, the plurality of feature values include an additional particular feature value indicating novelty information about the media content item with respect to the user associated with the user consumption data point, wherein the additional particular feature value is different than the particular feature value.

25. The data processing system of claim 17, wherein, for each user consumption data point, the plurality of feature values further include an additional particular feature value indicating popularity of the media content item with respect to one or more users other than the user associated with the user associated with the user consumption data point.

26. The data processing system of claim 17, wherein the selection value prediction model is a regression function.

27. The data processing system of claim 17, wherein the selection value prediction model is a classification function comprising a plurality of weights that respectively correspond with the feature values associated with the user consumption data point of the plurality of user consumptions data points.

28. The data processing system of claim 17, wherein the selection value prediction model comprises a plurality of weight values.

29. The data processing system of claim 28, wherein, for each media content item of the first plurality of media content items, determining the predicted selection score comprises summing a plurality of products, wherein each product in the plurality of products is based on a weight value of the plurality of weight values and a corresponding feature value in the plurality of feature values.

30. The data processing system of claim 17, further configured to cause display of media content information representing the media content items, wherein the media content information is ordered according to a result of the ranking.

31. The data processing system of claim 17, wherein each user consumption value of the plurality of user consumption values represents observed user consumption of the media content item associated with the user consumption data point that is associated with the user consumption value.

32. The data processing system of claim 17, further configured to:
- determine an unfavorable user consumption value for a certain user consumption data point associated with a certain user and a certain content item in response to determining:
- that the certain content item was selected for consumption by the certain user; and
- that the certain content item was not novel with respect to the certain user.

33. A method comprising:
- in a data processing system configured to generate personalized rankings of a first plurality of media content items in a catalog:
- determining a plurality of user consumption values, wherein each user consumption value of the plurality of user consumption values is associated with a user consumption data point of a plurality of user consumption data points, and wherein each user consumption data point is associated with a user and a media content item in a second plurality of media content items, wherein the first plurality of media content items is different than the second plurality of media content items;

determining, for each user consumption data point of the plurality of user consumption data points, a plurality of feature values associated with the user consumption data point, wherein the plurality of feature values include a particular feature value indicating whether the user associated with the user consumption data point consumed the media content item associated with the user consumption data point within a particular amount of time;

training a selection value prediction model based on each feature value of the plurality of feature values associated with each user consumption data point of the plurality of user consumption data points, wherein the selection value prediction model comprises a plurality of weight values;

for each media content item of the first plurality of media content items, determining a predicted selection score for an input user and the media content item by summing a plurality of products, wherein each product in the plurality of products is based on a weight value of the plurality of weight values and a corresponding feature value in the plurality of feature values;

ranking the first plurality of media content items in the catalog for the input user based on the predicted selection score for each media content item in the first plurality of media content items;

wherein the method is performed using one or more processors.

* * * * *